G. M. MERWIN.
CORN HUSKER AND SHREDDER.
APPLICATION FILED AUG. 28, 1911.

1,017,783.

Patented Feb. 20, 1912.

2 SHEETS—SHEET 2.

Witnesses:
C. C. Palmer.
F. W. Hoffmeister.

Inventor.
George M. Merwin.
By E. W. Burgess
Attorney.

UNITED STATES PATENT OFFICE.

GEORGE M. MERWIN, OF BERWYN, ILLINOIS, ASSIGNOR TO INTERNATIONAL HARVESTER COMPANY, A CORPORATION OF NEW JERSEY.

CORN HUSKER AND SHREDDER.

1,017,783. Specification of Letters Patent. Patented Feb. 20, 1912.

Application filed August 28, 1911. Serial No. 646,440.

*To all whom it may concern:*

Be it known that I, GEORGE M. MERWIN, a citizen of the United States, residing at Berwyn, county of Cook, and State of Illinois, have invented certain new and useful Improvements in Corn Huskers and Shredders, of which the following is a specification.

My invention relates to corn huskers and shredders, and consists in particular in improved mechanism forming part of the self-feeding mechanism whereby stalks are advanced toward the snapping rolls; the object of my invention being to provide means located between the delivery end of the stalk conveyer and the snapping rolls and leading to the receiving ends of the husking rolls and operative to agitate the broken stalks and falling ears in a manner to prevent an accumulation thereof at the point indicated, and to arrange the ears in proper position to be operated upon by the husking rolls. I attain this object by means of the mechanism illustrated by the accompanying drawings, in which—

Figure 1:
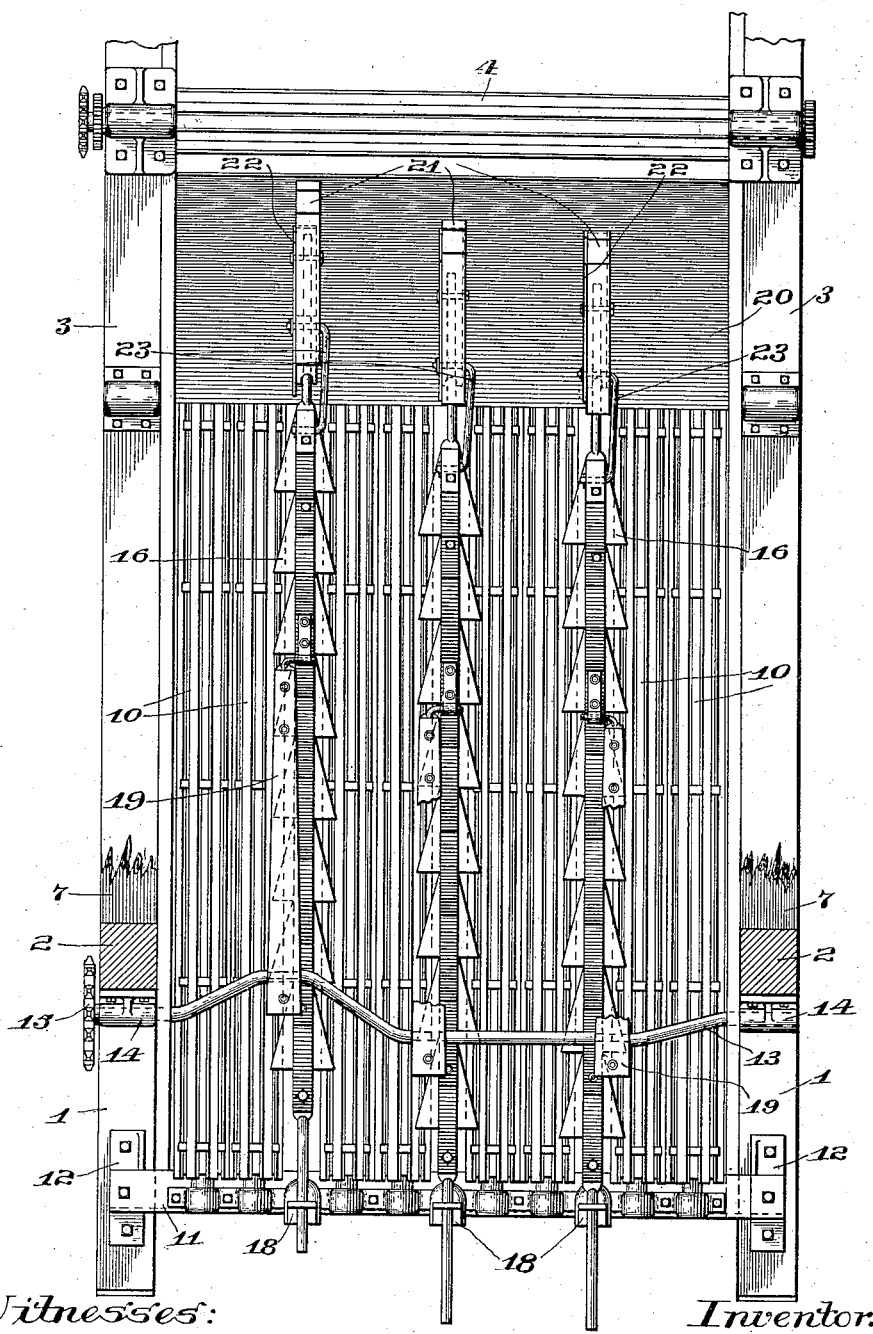
Figures 2, 3:
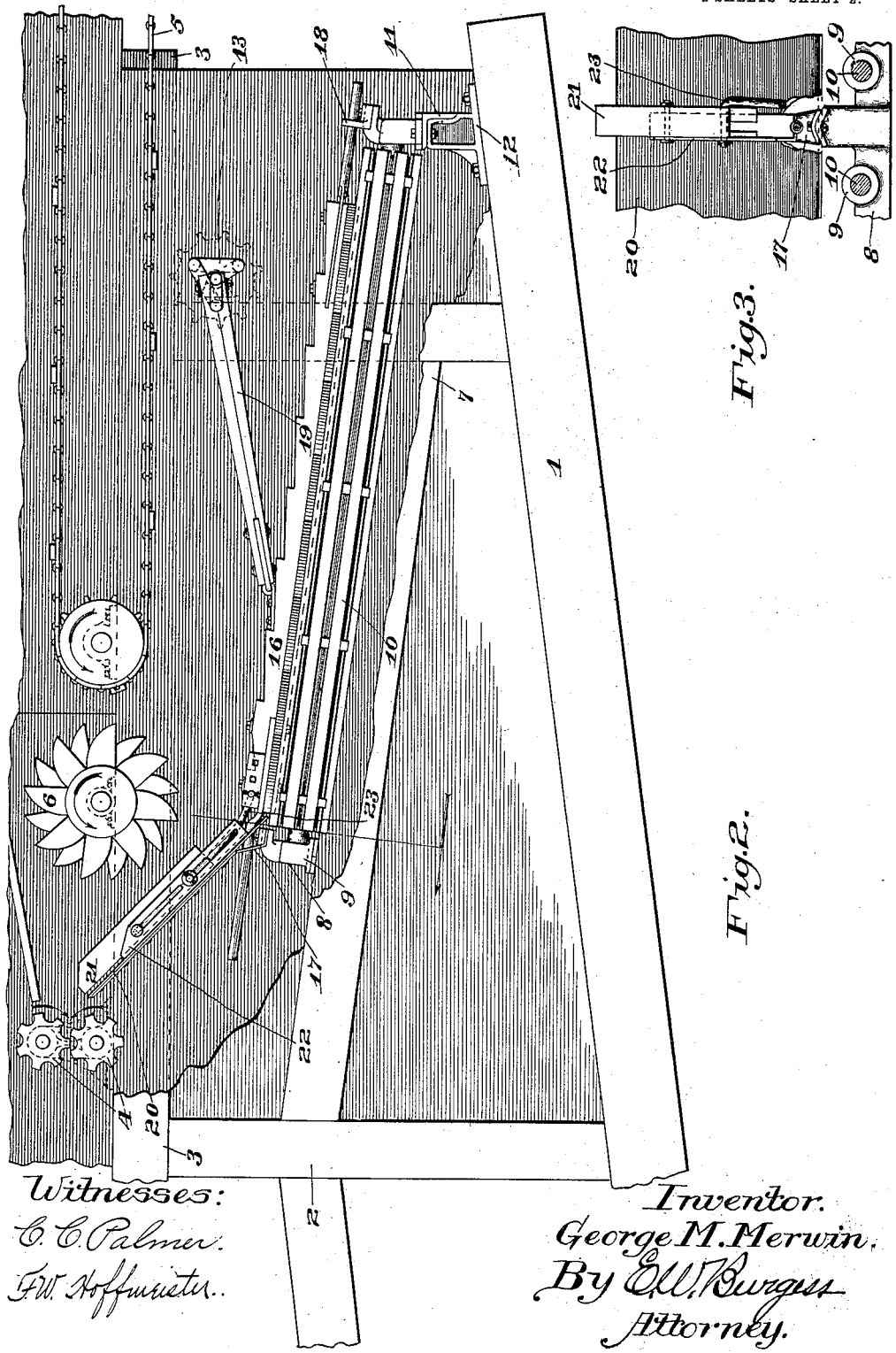

Figure 1 represents a top plan view of part of a corn husker and shredder having my invention embodied in its construction; Fig. 2 is a side elevation of part of a shredder designed to illustrate the operation of my invention; and Fig. 3 is a detached detail of part of the stalk agitating mechanism.

The same reference characters designate like parts throughout the several views.

1 represents longitudinally arranged side sill members upon opposite sides of the machine forming part of the frame of a corn husking and shredding machine; 2 represents vertically arranged frame members connecting the frame members 1 with longitudinally arranged frame members 3 at the upper part of the machine and designed to support the snapping rollers 4, that are journaled in bearings secured to the frame, an endless carrier 5 operative to advance the stalks toward the snapping rollers and the rotatable band cutter and supplemental feeder 6 located between the delivery end of the endless carrier and the snapping rollers.

7 represents an inclined frame forming part of the general frame structure of the machine and forming a support for the transverse bar 8, having the opposite ends thereof secured to the inclined frame and provided with bearing boxes 9, in which are journaled the receiving ends of a series of pairs of husking rollers 10 that incline downward toward the front end of the machine and have their delivery ends journaled in bearings carried by a transverse bar 11, having opposite ends thereof secured to the bracket members 12 that are secured to the side sill members 1 of the frame structure.

13 represents a multiple crank shaft journaled in bearings 14 secured to the vertically arranged frame members near the front end of the machine and having a sprocket wheel 15 secured to one end thereof whereby motion may be transmitted to said shaft from an operative part of the machine.

16 represents longitudinally movable ear retarding bars having opposite ends thereof slidably connected with bracket members 17 and 18 that are secured to the transverse bars 8 and 11, respectively. The bars are given a reciprocatory movement by means of pitmen 19 that connect them with the multiple crank shaft 13 in a common way.

20 represents an inclined deck leading from the snapping rollers forward and downward to the receiving end of the husking rollers and designed to receive the unhusked ears from the snapping rollers and conduct them to the husking rollers.

It is desirable in the operation of machines of the class indicated that the unhusked ears be delivered to the husking rolls in a manner having them substantially parallel in the direction of their length with the axes of the rolls in order that the rolls may perform their husking function in an efficient manner, and to attain that result I have provided a series of agitators 21 that are preferably made rectangular in cross section, and provided with transversely arranged bolts 21' that are received by longitudinally arranged slotted openings in the upper ends of brackets 22 secured to the deck 20 in a manner permitting the ears to fall upon the upper sides of said agitators, the agitators having a reciprocatory movement imparted thereto across the surface of the deck in the direction of the length of the husking rollers by means of pitmen 23 connecting their lower front ends with the rear ends of the ear retarding bars 16 the upper cranked portions of the pitmen being received by transverse openings in the bars and the slotted openings in the brackets,, the agitators being operative across the surface of the deck under and at opposite sides of the ears in a manner to cause the descending ears that have been severed from the stalks by the snapping rollers to assume a position upon the inclined deck with their lengths substantially in line with the husking rollers and thus facilitate their movement toward the receiving ends of the latter and also prevent any accumulation of broken stalks upon the deck that would impede a free movement of the unhusked ears.

What I claim as my invention, and desire to secure by Letters Patent, is:

1. A corn husking mechanism including, in combination, snapping rollers, means for advancing stalks toward said snapping rollers, husking rollers arranged in a plane below said snapping rollers and having the axes thereof at substantially right angles to said snapping rollers, an inclined deck leading from said snapping rollers to the receiving ends of said husking rollers, agitator bars preferably rectangular in cross section slidably connected with said deck and movable parallel with the surface thereof and in close proximity thereto whereby the upper and side surfaces thereof only engage with the ears, and means operative to transmit a reciprocatory movement to said bars and said husking rollers at right angles to said snapping rollers.

2. A corn husking mechanism including in combination, snapping rollers, means for advancing stalks toward said snapping rollers, husking rollers arranged in a plane below said snapping rollers and having the axes thereof at substantially right angles thereto, ear retarders slidably mounted above said husking rollers, means for transmitting a reciprocatory movement to said ear retarders in the direction of the length of said rollers, an inclined deck leading from said snapping rollers to the receiving ends of the husking rollers, agitator bars preferably rectangular in cross section slidably connected with said deck and movable parallel with the surface thereof and in close proximity thereto whereby the upper and side surfaces thereof only engage with the ears, and pitmen connecting the lower ends of said agitator bars with the rear ends of said ear retarders.

3. A corn husking mechanism including, in combination, snapping rollers, means for advancing stalks toward said snapping rollers, husking rollers arranged in a plane below said snapping rollers and having the axes thereof at substantially right angles thereto, ear retarders slidably mounted above said husking rollers, means for transmitting a reciprocatory movement to said ear retarders in the direction of the length of said rollers, an inclined deck leading from said snapping rollers to the receiving ends of said husking rollers, brackets secured to said deck, said brackets being provided with longitudinally arranged slotted openings parallel with said deck, agitator bars preferably rectangular in cross section and slidably connected with said brackets by means of bolts carried by said bars and received by the slotted openings in said brackets, said bars being operative in a plane substantially parallel with the axes of said husking rollers and in close proximity to said deck whereby the upper and side surfaces thereof only engage with the ears, and pitmen having cranked portions at opposite ends thereof connecting the lower ends of said agitator bars with the adjacent ends of said ear retarders, the cranked portions of the upper ends of said pitmen being received by one of the slotted openings in said agitator bars.

GEORGE M. MERWIN.

Witnesses:
RAY PATTISON,
FRANK A. ZABILKA.

---

Copies of this patent may be obtained for five cents each, by addressing the "Commissioner of Patents, Washington, D. C."